United States Patent
Keller et al.

(10) Patent No.: US 6,202,857 B1
(45) Date of Patent: *Mar. 20, 2001

(54) FRAME FOR FLAT SIFTER AND PROCESS FOR PRODUCING THE SAME

(75) Inventors: Christoph Keller, Lustmühle; Marc Bachmann, Wil, both of (CH)

(73) Assignee: Buhler AG, Uzwil (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/341,363

(22) PCT Filed: Jan. 23, 1998

(86) PCT No.: PCT/CH98/00023

§ 371 Date: Oct. 1, 1999

§ 102(e) Date: Oct. 1, 1999

(87) PCT Pub. No.: WO98/36854

PCT Pub. Date: Aug. 27, 1998

(30) Foreign Application Priority Data

Feb. 20, 1997 (DE) .............................. 197 06 601

(51) Int. Cl.⁷ ...................................................... B07B 1/49
(52) U.S. Cl. .......................... 209/404; 209/405; 209/401; 209/403; 209/402; 209/409; 209/408; 209/412
(58) Field of Search ................................... 209/405, 401, 209/403, 402, 404, 409, 408, 412

(56) References Cited

U.S. PATENT DOCUMENTS

| | | | |
|---|---|---|---|
| 2,455,383 | * 12/1948 | Pickard | 209/323 |
| 3,980,555 | * 9/1976 | Freissle | 209/408 |
| 4,219,412 | * 8/1980 | Hassall | 209/399 |
| 4,347,129 | * 8/1982 | Rutherford | 209/399 |
| 4,383,919 | * 5/1983 | Schmidt | 209/399 |
| 4,728,422 | * 3/1988 | Bailey | 210/314 |
| 4,950,403 | * 8/1990 | Huaff et al. | 210/486 |
| 5,045,184 | * 9/1991 | Arkles | 209/405 |
| 5,051,171 | * 9/1991 | Hukki | 209/323 |
| 5,137,622 | * 8/1992 | Souter | 209/403 |
| 5,266,194 | * 11/1993 | Chiodo | 210/232 |
| 5,385,241 | * 1/1995 | Bokor | 209/399 |
| 5,385,669 | * 1/1995 | Leone, Sr. | 210/488 |
| 5,417,906 | * 5/1995 | Chiodo | 264/153 |
| 5,527,500 | * 6/1996 | Specht | 264/46.4 |
| 5,538,139 | * 7/1996 | Keller | 209/382 |
| 5,598,931 | * 2/1997 | Hosogoshi et al. | 209/405 |
| 5,664,686 | * 9/1997 | Hosogoshi et al. | 209/405 |
| 5,755,334 | * 5/1998 | Wojcik et al. | 209/399 |
| 5,819,952 | * 10/1998 | Cook et al. | 209/400 |
| 5,851,393 | * 12/1998 | Carr et al. | 210/489 |
| 6,006,923 | * 12/1999 | Helmy et al. | 209/397 |

FOREIGN PATENT DOCUMENTS

| | | | |
|---|---|---|---|
| 25 06 981 B1 | 6/1976 | (DE) . | |
| 3544752 | * 5/1987 | (DE) | 209/405 |
| 3802799 A1 | * 10/1989 | (DE) . | |
| 0 330 846 A1 | 9/1989 | (EP) . | |
| 0 584 302 B1 | 8/1996 | (EP) . | |
| 1503343 | * 3/1978 | (GB) . | |
| 93/16815 | 9/1993 | (WO) . | |

* cited by examiner

Primary Examiner—Donald P. Walsh
Assistant Examiner—David Jones
(74) Attorney, Agent, or Firm—Finnegan, Henderson, Farabow, Garrett & Dunner

(57) ABSTRACT

The invention relates to a sieve frame for plan sifters and also to a method of producing it. It is used mainly in plan sifters for milling. The object is to improve the functionality of an insertable sieve frame and to simplify production. This object is achieved in that the sieve frame (1) including battens (2) is foamed from polyurethane in one part (and one operation), the sieve cloth (4) also being surrounded by foaming and the sieve frame (1) preferably containing a metal core (3)

22 Claims, 3 Drawing Sheets

FRAME FOR FLAT SIFTER AND PROCESS FOR PRODUCING THE SAME

Figure 1:
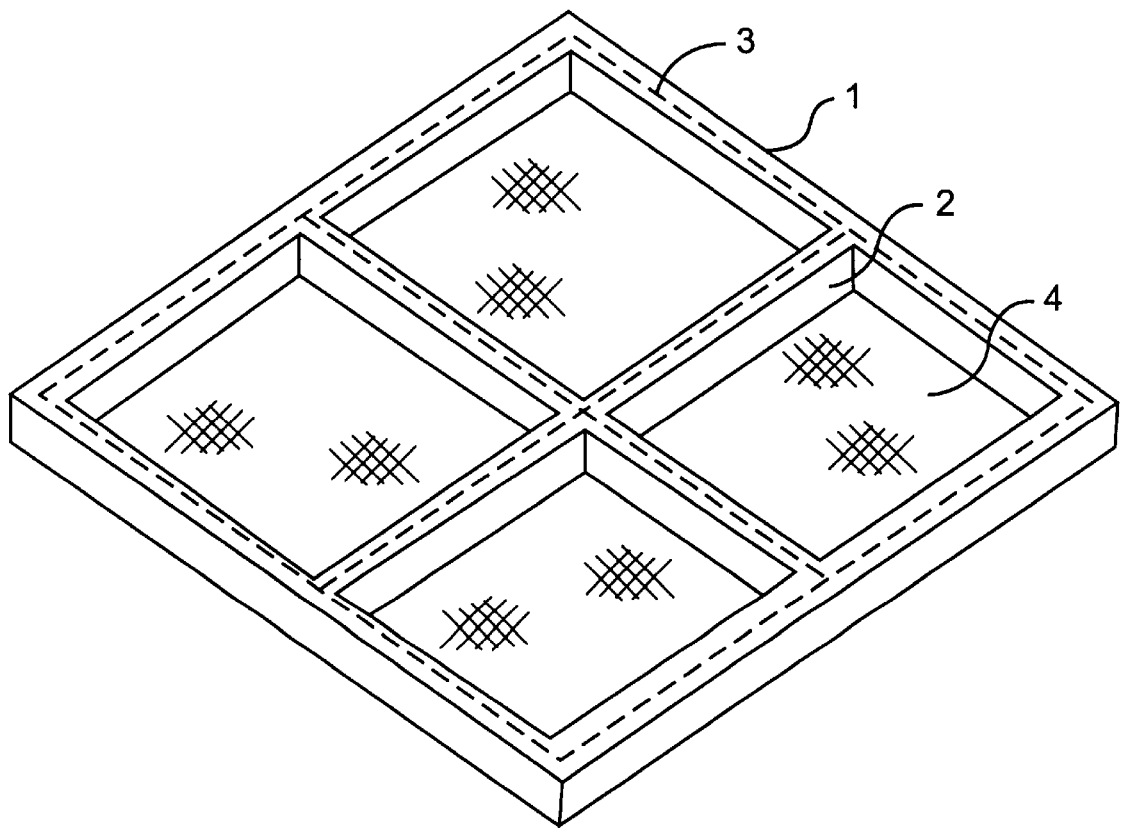

The invention relates to a sieve frame for plan sifters, in particular an insertable sieve frame which is inserted into a sieve box of a sieve and a method of producing such sieve frames.

A plan sifter, in particular a large plan sifter or square plan sifter is a cubic shape with large flat elements and is used for the sieving of corn, grit-like and floury products in milling and for sorting various types of cereal grains and the like.

With many separation procedures, for example in processing, it is known to reduce the product humidity, where necessary, so the separating devices do not clog. On the other hand, optimum moisture is desired for the processing of ground cereal products to flour, grit, shot etc. However, as repeated grinding and sieving has to be carried out in a cereal mill, the humidity is adjusted according to comminution and not according to the best possible sifting effect.

It is known that many ground fractions have poor flow behaviour and sifting behaviour owing to their moisture content.

All possible sizes of sieve mesh widths are used in a plan sifter, from about 80 μm upwards. Maximum sifting performance is to be achieved similarly for all, without clogging of the sieve mesh. The sieve cloth is tensioned over a sieve frame which, in turn, is inserted in a sieve box comprising a base plate and a fine material outlet as well as freely movable cleaning elements as described, for example, in EP-B-584302, EP-A-330846 or U.S. Pat. No. 3,565,251 etc.

The maximum possible throughput and the highest possible quality of ground products must be attainable. In contrast to conventional sieving, a closed layer of product up to several centimeters is maintained over the sieve covering when sifting in mills. As a result, a greater pressure acts downward on the finer heavier particles against the sieve covering, resulting in a higher throughput or a higher sieving performance. Flat husks (coarse material), on the other hand, should float to the top with the layer as sieve reject. With moist products, this method of thick layer sifting leads to frequent clogging of the sieve cloth and caking of product on the sieve box or the base plate.

More powerful plan sifters have been developed systematically in the past and the sieve cleaning has been continuously improved without basically overcoming the aforementioned (product-induced) problems. Numerous variations of forms and materials have been tested, some of which have been used in practice. Only a few forms have been retained in large plan sifters.

As already mentioned, keeping the base plate completely free is a further problem in plan sifters. The fine material passing through the sieve meshes (sifted matter) should be removed from the base plate in the shortest possible time and should be discharged through lateral slits. A variety of base cleaners has been developed for this purpose.

Several factors influence the mode of operation of plan sifters. Thus, a freshly covered sieve frame usually operates better as not only the wear of the cloth but also the tensioning of the sieve cloth are important. It is known from experience that plan sifters are subject to natural limits of performance, for example the intensity of the oscillating movement (maximum acceleration) owing to the maximum permitted forces in the plan sifter housing and on the other hand due to the movement of the product. Excessive accelerating forces obstruct the free passage of the product. The performance is determined by the specific quality of the individual sifted fractions.

DE A 2506981 suggests that the floor plate be given a saw-toothed surface so that the product is discharged suddenly. Advantages are conceivable in certain cases, however it can be expected that the ground fractions will quickly plug the floor plates or sifter box. One of the main requirements is that such key machines should be as self-cleaning as possible and easy to clean if necessary.

U.S. Pat. No. 5527500 portrays a process to manufacture a filter element or upholstery with a fabric clamped in a frame. The frame and fabric must be correspondingly stretchable and yielding. The frame and fabric have a large cross section and openings. The size of the opening is rather unsuitable for filter screens.

EP A 330846 and WO 93/16815 disclose devices for flat sifters consisting of a flat sifter screen that has a sifter housing with a fine material discharge, an insertable sifter frame, and freely moving cleaning elements. The sifter frame only has a coating on one side, and it is subdivided with bars in at least one direction to form a corresponding number of cleaning fields and a floor plate. Cleaning elements on the floor plate can be inserted to lie in the cleaning field(s). Corrugated grids or support grids are not necessary with these solutions.

The surfaces can be provided with a jacket made of foamed plastic, felt, etc., which will not be described further. The jacket is simply for the shell surrounding the screen of a sifter box in flat sifter. The sifter frame consists of a conventional wood construction.

In EP B 584302, the sifter frame is designed as an insertable frame with no connecting elements, but it consists of joined individual parts, preferably made of metal or bonded metal and wood. The sifter frame is advantageously made of welded or glued light metal sections. The intrinsic rigidity is sufficient to absorb the force arising from a sifter screen on one side without substantial deformation. Such a light metal frame, especially made of aluminum, can have permit problems depending on the country. The manufacturing effort is comparatively high (although much less than conventional screw connection, etc.). Strength problems may arise at the connecting sites due to the dynamic load (especially glued sites). The sifter box has a familiar wood frame with a stable shape and dimensions. Surfaces that guide product can be coated with plastic. The sifter frame and sifter box are harmonized with each other so that the frame can be loosely inserted into the sifter box. The floor plate of the sifter box can be made of metal, or plastic in special instances. In EP A 330849, the inner surfaces of the sifter housing are made of aluminum with a food-compatible wear-resistant covering made of foamed plastic to provide noise insulation and a seal.

The invention is based on the problem of developing a generic insertable sifter frame to improve its performance and simplify its manufacture. A second facet of the problem is to improve the manufacturing procedure to the sifter frame.

The problem according to the invention is solved by manufacturing the sifter frame including bars as a single piece of plastic. The filter screen is bonded to the sifter frame and bars with foam. In one development, the sifter frame can also contain a reinforcing skeleton. In the simplest case, the skeleton is a welded metal frame. The plastic is preferably foamed plastic, especially a PUR material. Foamed sealing elements can also be provided in place of the usual felt seals. The filter screen is also foamed in.

The manufacturing process is simplified in that the skeleton and filter screen are inserted in a mold, and the complete frame is foamed in a single step with varying tightness to the filter screen depending on the screen thickness. At the sifter frame and the bars, the filter screen is surrounded or embedded in plastic.

The insertable sieve frame has basically has the same advantages as those described in EP-B-584302, i.e. it can easily be removed from a sifter box, and the filter screen can be easily cleaned on both sides with water, hot steam, etc. Screens can also be advantageously stacked in the flat sifter box. The advantageous plastic design of the floor plate clearly decreases product adhesion and helps reduce noise; the same is true when plastic sifter cleaners are used.

Figure 2:
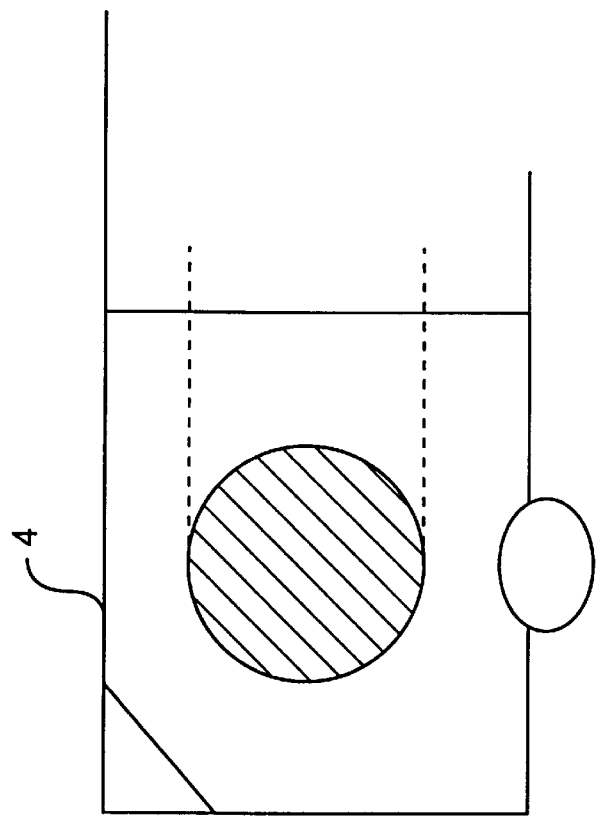
Figure 2:
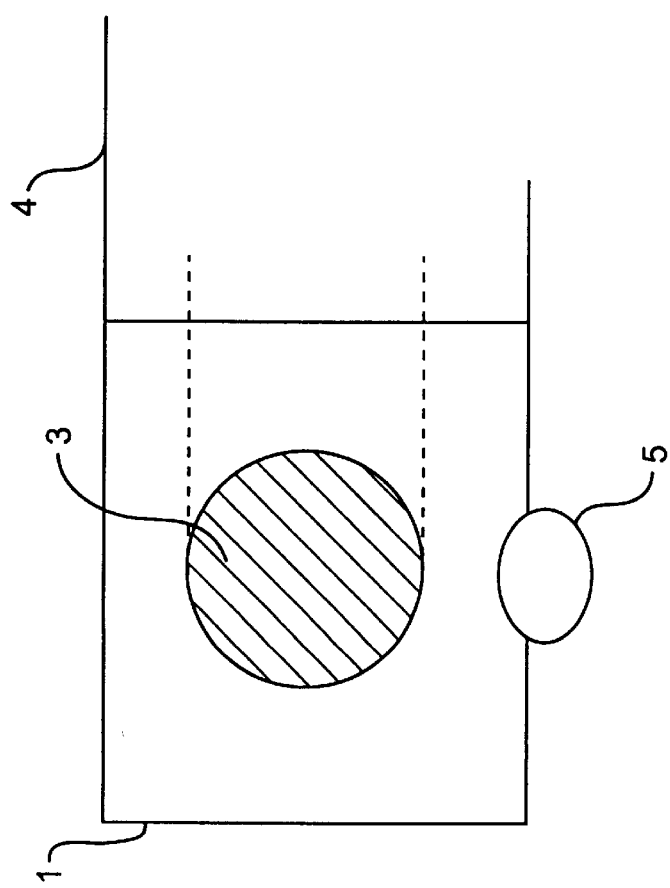
Figure 3:
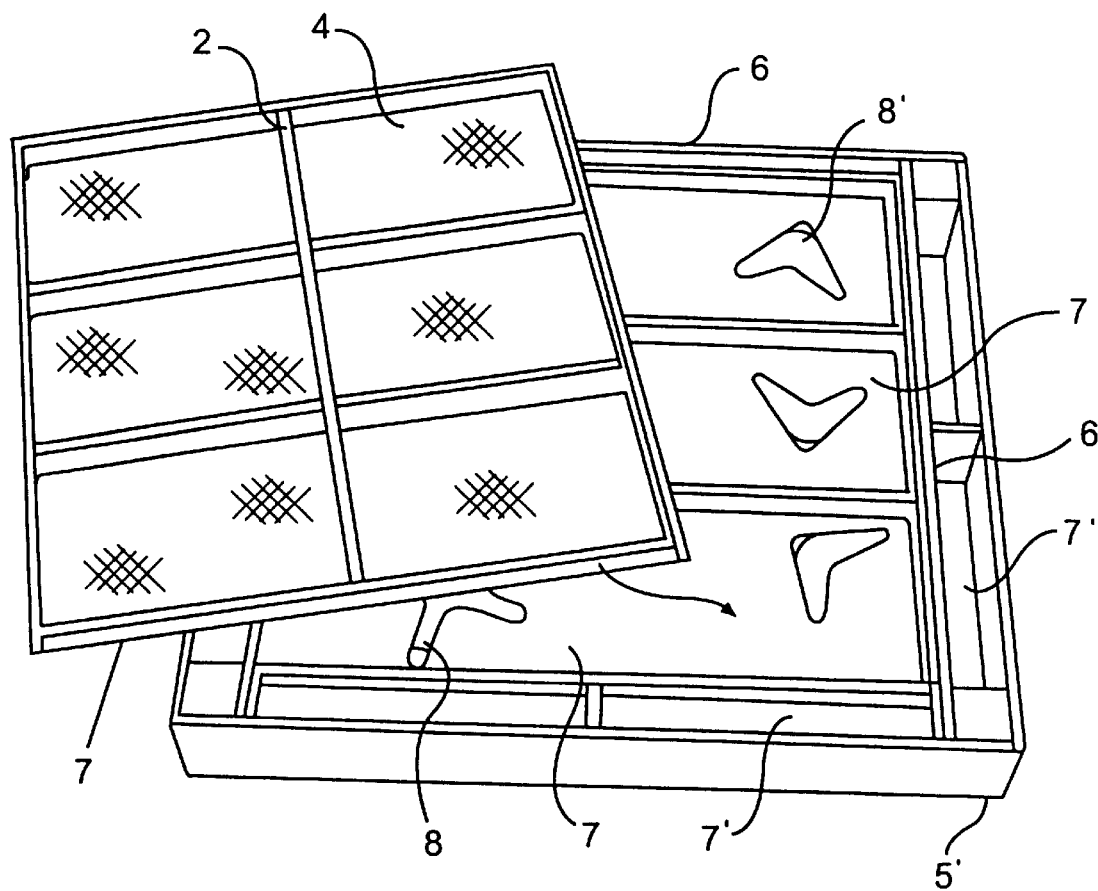

The invention will be further explained in an exemplary embodiment with reference to a drawing. Shown in the drawing are:

FIG. 1: A sifter frame
FIG. 2: A section of the sifter frame from FIG. 1.
FIG. 3: A sifter box with a sifter frame partly lying on it.

A sifter frame 1 frequently has 6–12 rectangular cleaning fields. For the sake of simplicity, it is divided into four cleaning fields in FIG. 1 with strips 2. See e.g. EP B 584302 for a detailed description of a familiar sifter box. The sifter box 1 is a short, exchangeable, insertable frame whose intrinsic strength is sufficiently great due to its continuous metal core 3. This metal core 3 is surrounded by foamed PUR and hence forms a single-piece sifter frame 1. The filter screen 4 sits tightly on the sifter frame 1 and the bars 2, and foam encloses it at these sites to prevent the screen from growing slack. The sifter box 6 has foamed-in seals 5', and the sifter frame 1 can also have such seals 5 instead of the conventional felt seals.

The floor 7 of the sifter frame 6 is also a foamed PUR, and freely movable prior art sifter cleaners 8, 8' sit on the floor (viz. cleaning field).

The filter screen (4) of the sifter frame (1) is flush with the sifter box (6) at the top.

The sifter frame 1 is created by first inserting the metal core 3 in the form of a welded pieces of round steel sections, etc. in a mold (not shown). Then the filter screen 4 is placed in the mold so that it will be completely surrounded by foam and tightened (FIG. 2) in the sifter frame 1 and the bars 2 at the surfaces facing the filter screen 4. This can be accomplished in different ways. The filter screen 4 can be placed flat on the sifter frame 1 and the bars 2. Any residue on the sifter frame 1 after foaming can be removed (FIG. 2a). The filter screen 4 can also be angled at the sifter frame 1 and completely or partially foamed into the sifter frame (FIG. 2b). Any residue can be subsequently removed.

After hardening, the finished sifter frame 1 is removed from the mold. The PUR material can be used with foods. The invention is not limited to this example.

List of Reference Numerals 1 sieve frame
2 battens
3 metal core
4 sieve cloth
5, 5' seal
6 sieve box
7, 7' base
8, 8' sieve cleaner

What is claimed is:

1. A sifter comprising:
a sifter box having sidewalls and a floor;
a sifter frame configured to be inserted into the sifter box, said sifter frame including
a mesh having edge regions; and
a plurality of peripheral frame elements defining an area, the peripheral frame elements being formed from a plastic material,
wherein the edge regions only of the mesh are bonded onto the peripheral frame elements with a foam plastic to thereby secure the mesh to the frame elements.

2. The sifter according to claim 1, wherein a dividing frame element extends across the mesh to divide the area into at least two sections, the dividing frame element being formed from a plastic material and a portion of the mesh adjacent the dividing frame element being bonded thereto.

3. The sifter according to claim 1 or claim 2, wherein the frame elements contain a reinforcing skeleton.

4. The sifter according to claim 3, wherein the skeleton is a metallic reinforcing core.

5. The sifter according to claim 1 or claim 2, wherein the plastic material is a a foam plastic material.

6. The sifter according to claim 1 or claim 2, wherein the plastic material is polyurethane.

7. The sifter frame according to claim 2, wherein the frame elements contain a reinforcing skeleton.

8. The sifter frame according to claim 7, wherein the skeleton is a metallic reinforcing core.

9. The sifter frame according to claim 2, wherein the plastic material is a foam plastic material.

10. The sifter frame according to claim 2, wherein the plastic material is polyurethane.

11. A sifter frame for use with a flat sifter box, the sifter frame comprising:
plastic peripheral frame elements defining an area;
at least one plastic dividing frame element disposed in said area between said peripheral frame elements so as to divide said area into at least two sections;
a filter screen having edge regions only bonded with a foam plastic to said peripheral frame elements and said dividing frame element forming one of the sections; and
a sifter box having sidewalls and a floor,
wherein the sifter frame is configured to be inserted into the sifter box.

12. The sifter frame of claim 11, wherein the peripheral frame elements and the dividing frame element include a reinforcing skeleton.

13. The sifter frame of claim 12, wherein the reinforcing skeleton is a metal core.

14. The sifter frame of claim 11, wherein the plastic is a polyurethane foam.

15. The sifter frame of claim 11, wherein said sifter box is made of polyurethane foam plastic.

16. A method of making a sifter frame for use with a flat sifter box, the method comprising:
providing a mold configured to form peripheral frame elements defining an area and at least one dividing frame element disposed in said area between said peripheral frame elements to divide the area into at least two sections;
positioning a reinforcing skeleton in the mold;
positioning a filter screen having edge regions in the mold at a distance from the reinforcing skeleton;
filling the mold with a plastic to form said peripheral frame elements and the at least one dividing frame element such that only the edge regions of the filter screen are bonded to the peripheral frame elements and the dividing frame element forming one of the sections using a foam plastic, wherein the sifter box has sidewalls and a floor and the sifter frame is configured to be inserted into the sifter box.

17. The method of claim 16, wherein the filter screen is individually stretched with respect to the section depending on the type of filter screen used to form the filter frame.

18. The method of claim 16, wherein positioning the reinforcing skeleton includes positioning a metal core in the mold.

19. A sifter, comprising:

a sifter box having sidewalls and a floor; and a sifter frame configured to be inserted into the sifter box, said sifter frame including peripheral frame elements defining an area;

at least one dividing frame element disposed in said area between said peripheral frame elements so as to divide said area into at least two sections; and a filter screen having edge regions only secured to said peripheral frame elements and said dividing frame element forming one of the sections, wherein the peripheral frame elements and the dividing frame element are made by filling a mold with plastic, the filter screen being positioned with respect to the mold such that the edge regions only of the filter screen are secured to the peripheral frame elements and dividing frame element by the filled plastic.

20. The sifter of claim 19, wherein the peripheral frame elements and the dividing frame element are made by filling a mold with a foam plastic.

21. The sifter of claim 19, wherein the peripheral frame elements and the dividing frame element include a reinforcing skeleton, the reinforcing skeleton being positioned in the mold prior to filling the mold with plastic to form the peripheral frame elements and the dividing frame element.

22. The sifter of claim 19, wherein a plurality of filter screens are secured to the peripheral frame elements and the at least one dividing element over a plurality of sections, each said filter screen being individually tensioned during securing of the filter screen.

* * * * *

UNITED STATES PATENT AND TRADEMARK OFFICE
CERTIFICATE OF CORRECTION

PATENT NO. : 6,202,857 B1
DATED : March 20, 2001
INVENTOR(S) : Keller et al.

Page 1 of 1

It is certified that error appears in the above-identified patent and that said Letters Patent is hereby corrected as shown below:

Claim 3, column 4,
Line 13, after "claim 1" delete "or claim 2".

Claim 5, column 4,
Line 17, after "claim 1", delete "or claim 2";
Line 18, before "foam plastic, delete "a" (second occurrence).

Claim 6, column 4,
Line 19, after "claim 1", delete "or claim 2".

Signed and Sealed this

Fourth Day of September, 2001

*Attest:*

*Attesting Officer*

NICHOLAS P. GODICI
*Acting Director of the United States Patent and Trademark Office*